Jan. 2, 1934.  A. S. HOWELL  1,941,473
CENTRIFUGAL SPEED GOVERNOR
Filed April 4, 1929  3 Sheets-Sheet 1

Inventor,
Albert S. Howell
By: Miehle & Miehle,
Atty's.

Jan. 2, 1934.  A. S. HOWELL  1,941,473
CENTRIFUGAL SPEED GOVERNOR
Filed April 4, 1929  3 Sheets-Sheet 2
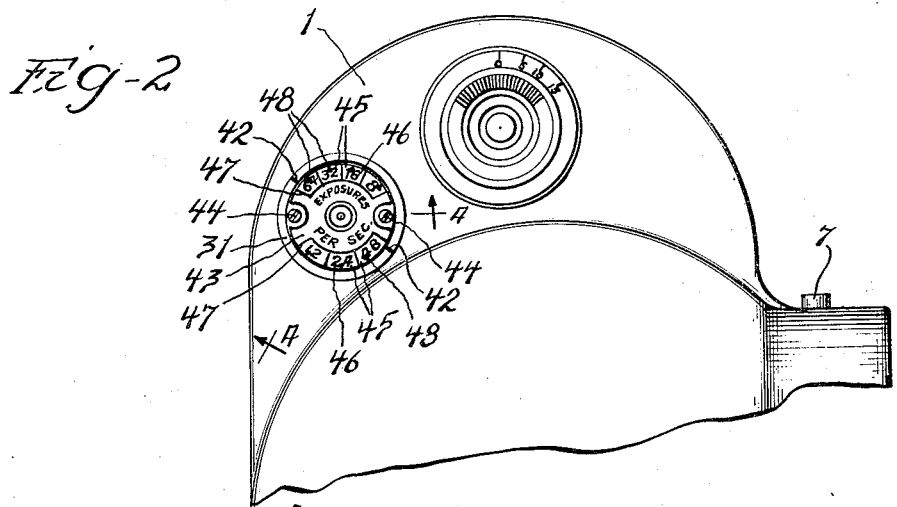
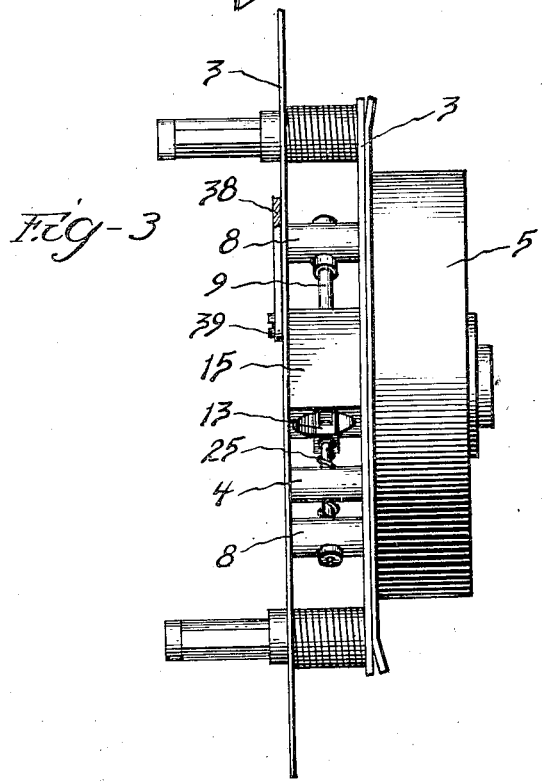
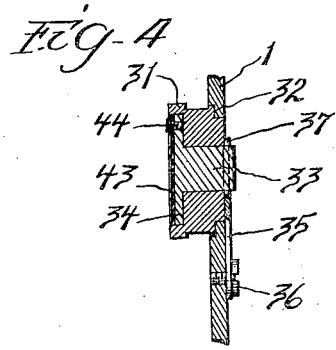

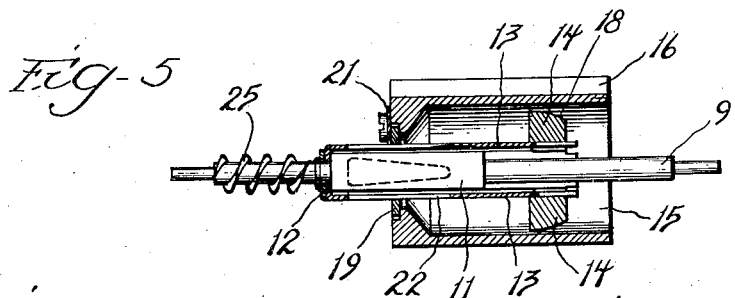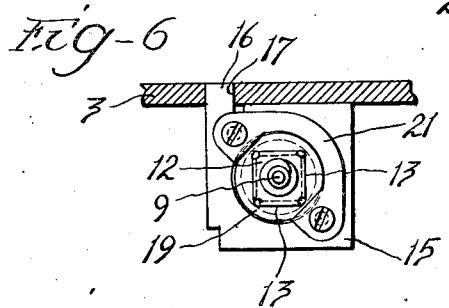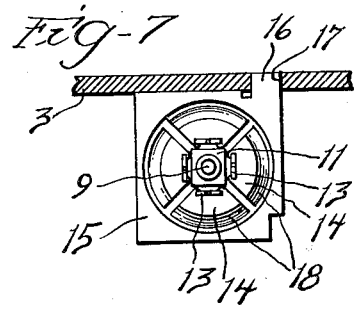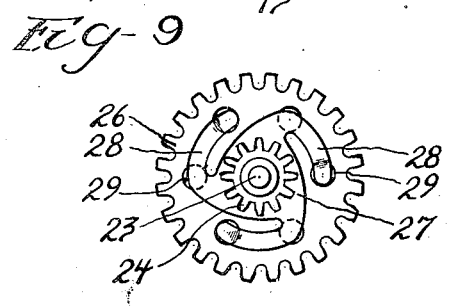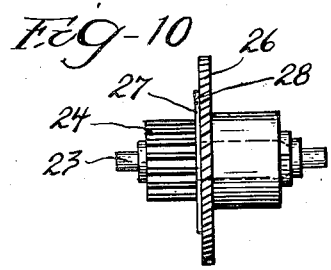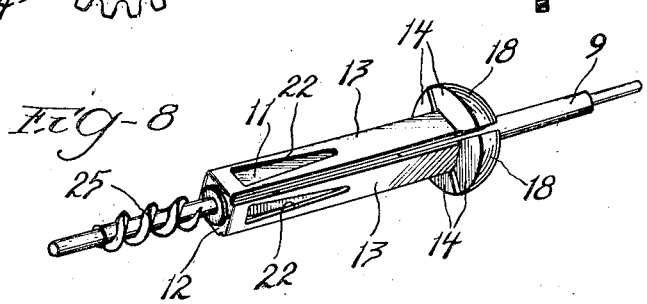

Patented Jan. 2, 1934

1,941,473

UNITED STATES PATENT OFFICE 1,941,473

CENTRIFUGAL SPEED GOVERNOR

Albert S. Howell, Chicago, Ill., assignor to The Bell & Howell Company, Chicago, Ill., a corporation of Illinois Application April 4, 1929. Serial No. 352,390

5 Claims. (Cl. 188—184)

My invention relates particularly to centrifugal speed governors for spring driven motion picture cameras although not limited to this use alone.

The main features of the invention relate to an accurate and dependable adjustable governor which is well adapted for its purposes, which is adapted for a comparatively wide range of controlled speeds, and which is particularly adapted for a certain well known type of spring driven motion picture camera.

The above features and certain other features hereinafter appearing are embodied in the preferred form of my invention, hereinafter fully described and illustrated in the accompanying drawings, and are effected by certain novel constructions, combinations and arrangements of parts particularly pointed out in the appended claims.

In the said drawings—

Figure 2 is a partial opposite side elevation of the same;

Figure 3 is a rear elevation of a portion of the mechanism of the camera;

Figure 4 is a partial section on the line 4—4 of Figure 2;

Figure 5 is an axial section of the centrifugal speed governor of my invention;

Figure 6 is a sectional view showing the governor in end elevation;

Figure 7 is another sectional view showing the governor in opposite end elevation;

Figure 8 is a perspective view of the revolving shaft assembly of the governor;

Figure 9 is an end elevation of the driving gear assembly of the governor; and

Figure 10 is a side elevation of the same.

Like characters of reference indicate like parts in the several views.

Figure 1:
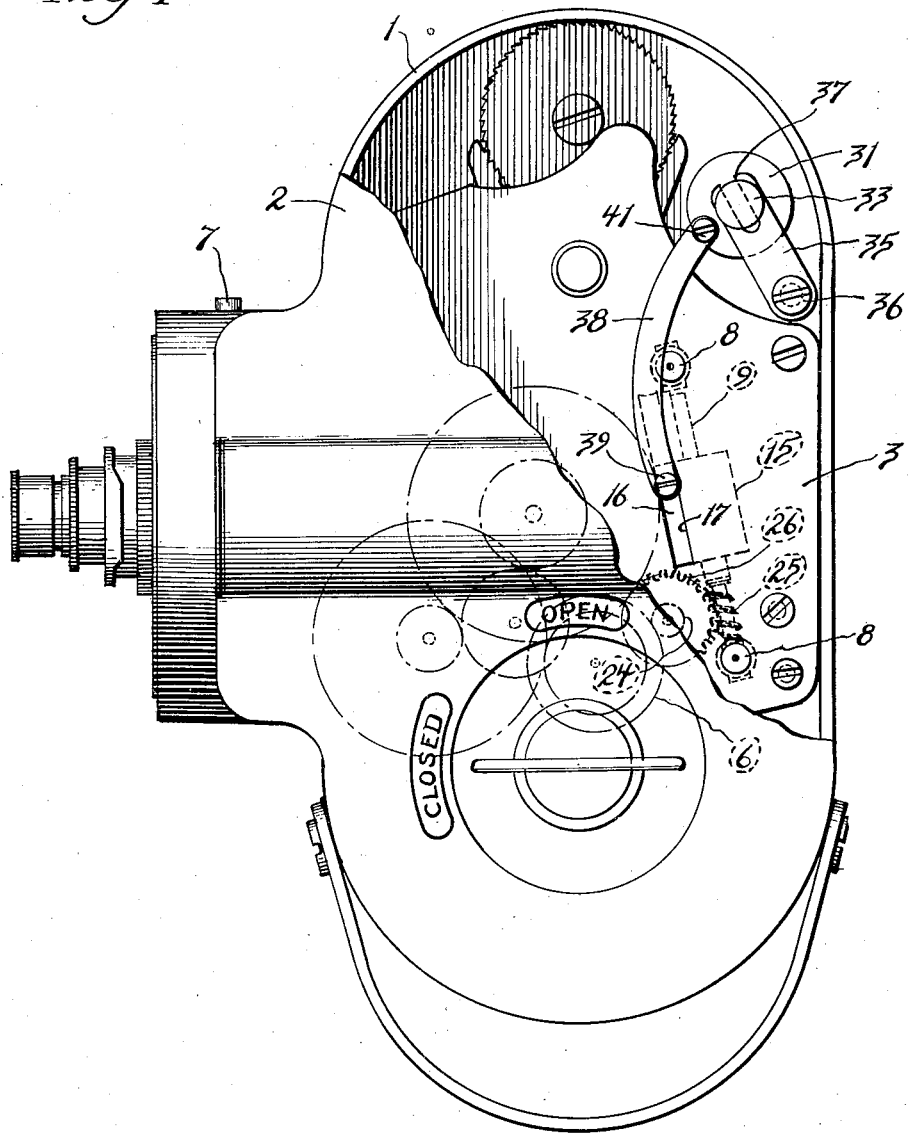
Figure 1 is a side elevation of a certain well known type of spring driven motion picture camera embodying my invention, with a portion broken away.

Referring to the drawings, 1 designates a casing, one side of which is formed by a removable cover 2. See Figures 1 and 2. Secured within the casing is a mechanism frame comprising parallel frame plates 3 secured in spaced relation by spacing studs 4 extending across between the same. See Figures 1 and 3.

Mounted on the outer face of the inside frame plate 3 is a spring motor 5 which drives the film feeding and exposing mechanism of the camera through spur gearing 6 carried by and disposed between the frame plates 3 on transverse axes. See Figures 1 and 3. Operation of the camera mechanism by the spring motor is controlled by means of a manually operated plunger 7 projecting from the casing 1 and operative upon a stop mechanism unnecessary to be described. See Figures 1 and 2.

Extending across between the frame plates 3 and secured thereto is a pair of spaced studs 8, and revolubly mounted on these studs and extending between the same in spaced parallelism with the frame plates is a shaft 9. See Figures 1 and 3.

An intermediate portion 11 of the shaft 9 is polygonal or square in cross section, and a spring member, formed of flat stock, has a bored central portion 12 engaged on and secured with the shaft, and has angularly arranged springs 13 extending longitudinally of the shaft from said central portion and in overlying relation with the faces of the polygonal portion 11 of the shaft. See Figures 5 and 8.

Weights 14 are secured on the free ends of the springs 13, and, as so mounted, are responsive to centrifugal force with rotation of the shaft 9, the springs 13 operating to oppose centrifugal force.

A bored friction member 15 is slidably engaged between the frame plates 3 and is provided with a rib 16, extending in parallelism with the bore thereof, which is slidably engaged in a slot 17 formed in the outer frame plate 3 and extending in parallelism with the shaft 9. See Figures 1, 6 and 7.

As so mounted the friction member 15 is slidably mounted for movement longitudinally of the shaft 9, and the bore of the friction member is disposed concentrically with this shaft and surrounds the weights 14 for frictional engagement with exterior spherical friction surfaces 18 on the weights when centrifugal force, operative upon the weights, overcomes the opposing action of the springs 13, whereby to exert a braking action upon the shaft to control the speed thereof. See Figures 5 and 7.

A control member 19 is provided with a polygonal aperture corresponding with the arrangement of the springs 13 and surrounds the same and is engageable therewith. See Figures 5 and 6. The member 19 is circular and is engaged for rotation in a reduced and shouldered end portion of the bore of the friction member 15, a retaining clip 21 secured on the adjacent end of the member 15 overlying the member 19 to retain the member 19 in said reduced and shouldered portion of the bore of the member 15.

As so mounted on the member 15, the member 19 is fixed with the member 15 axially of the shaft 9, but is rotatable with respect thereto with the springs 13. Accordingly, movement of the member 15 along the shaft 9 effects movement of the control member 19 along the springs 13 and consequent change of the point of engagement therewith, whereby the effective strength of the springs 13 with respect to opposition to centrifugal force effective upon the weights is varied with corresponding change in the controlled speed of the governor. Furthermore, the place of engagement of the weights 14 with the bore of the friction member 15 changes with adjustment of the member 19 to vary the controlled speed of the governor with obvious advantage.

The springs 13 are provided with longitudinally extending apertures 22 adjacent the central portion 12 of the spring member, which enlarge in width toward said central portion in order to render the springs more flexible adjacent their secured ends. See Figures 5 and 8.

The governor shaft 9 is driven from the gearing 6, which is driven by the spring motor 5, in the following manner. See Figures 1, 9 and 10.

A revoluble shaft 23 is carried by and extends across between the frame plates 3 on a transverse axis, and has secured thereon a spur pinion 24 which meshes with one of the gears of the gearing 6, whereby the shaft 23 is driven from the spring motor 5.

The governor shaft 9 has formed thereon a spiral gear 25, and a relatively large gear 26 is mounted on the shaft 23 for rotation with respect thereto and meshes with the spiral gear 25 for driving the shaft 9. A flat spring clutch member 27 is fixed on the shaft 23 and is disposed between the spur pinion 24 and the gear 26, and is provided with angularly extending spring clutch fingers 28 pressing against the web of the gear 26. The free ends of the fingers 28 have a ratchet engagement with clutch formations in the form of apertures 29 through the web of the gear 26, whereby to form an automatic one way driving connection between the gearing 6 and the governor shaft 9.

Consequently, when the operation of the gearing 6 and the camera mechanism is stopped suddenly, as by release of the control plunger 7, the governor shaft 9 with the rotating parts thereon and the gear 26 continue to rotate until their momentum is spent, whereby the gearing 6 and related parts are not subjected to the strain which would result were the governor shaft 9 and related parts and the gear 26 not permitted to overrun the gearing 6 upon sudden stoppage thereof. Upon starting operation of the gearing 6 the aforementioned one way clutch drives the governor to control the speed of the camera mechanism and gearing 6 until it is stopped.

Control of the governor to vary the controlled speed thereof is accomplished in the following manner. See Figures 1, 2, 3 and 4.

A portion of the wall of the casing 1 extends above and is disposed in adjacent parallelism with the outer frame plate 3, and this portion of the casing wall is provided with a bore therethrough in which is engaged for angular movement a manually operable concentrically bored adjusting member 31 having an inwardly axial engagement with the casing wall, as designated at 32, to limit inward axial movement of the adjusting member with respect to the casing. See Figure 4.

A headed member 33 is engaged for relative angular movement in the bore of the member 31 and has the head 34 thereof disposed exteriorly and inwardly engaged in an enlarged outer end of this bore to limit outward axial movement of the member 31 with respect to the member 33.

The shank of the member 33 extends inwardly beyond the member 31 and the aforementioned portion of the wall of the casing 1. See Figures 1 and 4. A securing arm 35 has one end thereof secured against the inner face of the said portion of the wall of the casing 1 by means of a headed screw 36, and the other end of this arm is bifurcated, as designated at 37, and is engaged in diametrically opposite chordal slots formed in the shank of the member 33 adjacent the inner end thereof.

Thus the member 33 is secured with the casing 1 against axial and angular movement while the adjusting member 31 is angularly movable with respect thereto and is conveniently manually adjustable in its angular movement by reason of its projection exteriorly of the casing 1.

A connecting link 38 at the outer face of the outer frame plate 3 has one end thereof pivotally connected with the rib 16 of the friction member 15 by means of a headed screw stud 39 and has its other end pivotally connected to the inner end of the adjusting member 31 by means of a second headed screw stud 41 disposed adjacent the periphery of the member 31. See Figures 1 and 3. Thus, angular adjustment of the adjusting member 31 effects corresponding adjustment of the friction member 15 and the control member 19 to adjust the controlled speed of the governor.

In order that the controlled speed of the governor may be predeterminately adjusted an indicating means is provided which will now be described. See Figures 2 and 4.

The outer end of the adjusting member 31 is provided with diametrically opposite peripherally disposed index marks 42, and a cooperating circular scale member 43 is detachably secured on the outer face of the head 34 of the member 33 by means of a pair of headed screws 44 whereby the scale member is replaceable in a predetermined position thereon.

The scale member 43 is provided with standard indicated spaces 45 cooperating with respective of the index marks 42 to indicate ranges of adjustment of the adjusting member 31 embracing corresponding adjustments of the adjusting member, characters 46 at said spaces identifying said adjustments with corresponding spaces. See Figure 2.

In order that the spaces 45 may be of adequate length the scale is formed of two diametrically opposite sections 47, each cooperating with a respective index mark 42, the spaces, consecutive with respect to adjustment of the governor, being disposed alternately in the two sections, whereby, in cooperation with the respective index marks, they indicate relatively large overlapping ranges of adjustment without rendering the scale involved or confusing.

As so comprised the said scale member 43 is standard and is predeterminately mounted for replacement. After assembly the scale is calibrated in accordance with actual test, and marks 48 are placed individually on the scale for cooperation with the respective index mark 42 to indicate predeterminately the corresponding adjustment of the governor as identified by the corresponding spaces 45 and characters 46.

Thus a standard scale is utilized which provides for close calibration, corresponding with the particular camera, in a convenient manner. In the event that a different calibration is required, as where the characteristics of the mechanism are changed say through long use, overhauling or replacement of parts, the calibrated scale is replaced by a new uncalibrated scale, which is then calibrated by actual test.

While I have described and shown the preferred embodiment of my invention I do not wish to be limited to the precise details of construction as changes may readily be made without departing from the spirit of my invention, but having thus described my invention, I claim as new and desire to secure by Letters Patent the following:

1. In a device of the character described the combination with a frame plate, of a revoluble shaft carried with said frame plate and disposed correspondingly with and spaced from one face thereof, a centrifugal speed governor associated with said shaft and including an adjusting member carried with said plate at said face thereof for movement longitudinally of said shaft and slidably engaging in a correspondingly disposed slot through said plate, and means at the opposite side of said plate and connected with the portion of said adjusting member engaged in said slot for controlling said movement of the adjusting member.

2. In a device of the character described the combination with a frame plate, of a revoluble shaft carried with said frame plate and disposed correspondingly with and spaced from one face thereof, a centrifugal speed governor associated with said shaft and including an adjusting member carried with said plate at said face thereof for movement longitudinally of said shaft and provided with a rib extending correspondingly with said movement and slidably engaged in a correspondingly disposed slot through said plate, and a connecting link at the other face of said plate and pivotally connected with said rib for controlling said movement of the adjusting member.

3. In a device of the character described the combination with a frame including parallel frame plates, of a revoluble shaft carried with said frame and disposed between said plates and extending correspondingly with the planes thereof, a centrifugal speed governor associated with said shaft and including an adjusting member disposed between said plates and slidably engaged therewith for movement longitudinally of said shaft and provided with a rib extending in a direction corresponding with said movement and slidably engaged in a correspondingly disposed slot through one of said plates, and means on the outside of said last mentioned plate and associated with said rib for controlling said movement of the adjusting member.

4. In a centrifugal speed governor the combination of a revoluble shaft, springs arranged angularly about said shaft and secured at one of their ends thereto and extending longitudinally thereof, weights fixed at the free ends of said springs and responsive to centrifugal force, a bored friction member adjustable axially of said shaft and having its bore disposed concentrically with said shaft and frictionally engageable by said weights, a control member surrounding said springs for restricting outward radial movement thereof, and means whereby said control member is fixed with said friction member axially of said shaft for adjustment with said friction member and rotatable with respect to the friction member on the axis of said shaft.

5. In a centrifugal speed governor the combination of a revoluble shaft, a spring member formed of flat stock and having a bored central portion engaged on and secured with said shaft and having angularly arranged springs extending longitudinally of the shaft from said central portion, weights secured on the free ends of said springs and responsive to centrifugal force, an apertured control member surrounding said springs for restricting said springs against outward radial movement, a bored friction member movable axially of said shaft and having its bore disposed concentrically with said shaft and frictionally engageable by said weights, and means whereby said control member is fixed with said friction member axially of said shaft for adjustment with said friction member and rotatable with respect to the friction member on the axis of said shaft.

ALBERT S. HOWELL.